Sept. 18, 1956   F. C. STEWARD ET AL   2,763,540
COMPOSITIONS AND METHODS FOR STIMULATING PLANT GROWTH
Filed Dec. 3, 1954
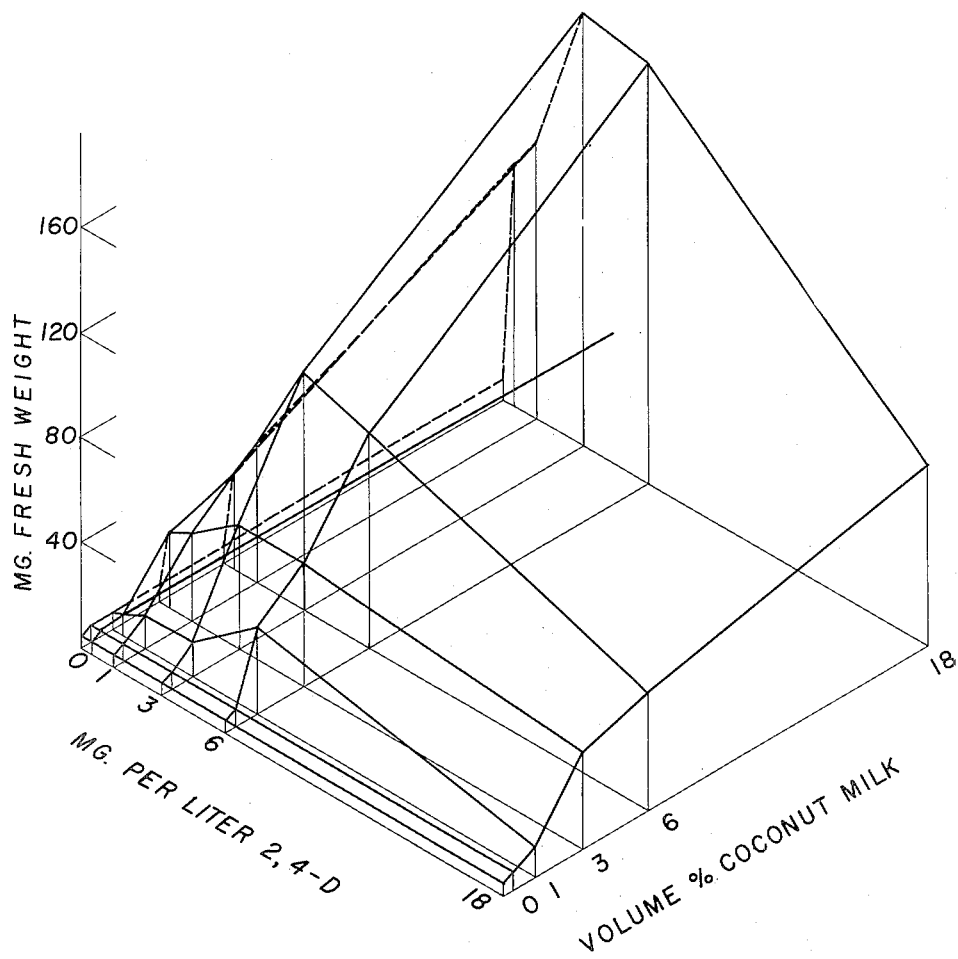
INVENTORS
FREDERICK C. STEWARD
& SAMUEL M. CAPLIN
BY C. Harold Herr
ATTORNEY 2,763,540

COMPOSITIONS AND METHODS FOR STIMULATING PLANT GROWTH

Frederick C. Steward, Ithaca, and Samuel M. Caplin, Rochester, N. Y.

Application December 3, 1954, Serial No. 473,006

9 Claims. (Cl. 71—2.6)

This invention relates to compositions comprising coconut milk and a synthetic plant growth regulant having plant hormone action.

This application is a continuation-in-part of our copending application Serial No. 285,411, filed May 1, 1952, now abandoned.

Coconut milk, the nutritive, fluid endosperm by which the developing cocos embryo is nourished, has previously found some application in the culture of bacteria, fungi and orchid embryos, and immature plant embryos. It has also been recently found that coconut milk is successful in stimulating Jerusalem artichoke tuber tissue and the mature secondary phloem of the carrot root into active growth.

However, no one has heretofore used coconut milk as a synergist for a synthetic plant growth regulant having plant hormone action.

We have found very unexpectedly and unpredictably that when coconut milk is combined with certain known plant growth regulants having plant hormone action, a total plant growth activity is obtained which is greater than that which would be obtained if an equivalent amount of pure plant growth regulant alone were used.

The new compositions of this invention comprising coconut milk and a synthetic plant growth regulant having plant hormone action thus exhibit marked synergistic effects, particularly on the growth of certain parts of plants such as, for instance, the tuber of potato (*Solanum tuberosum*).

The coconut milk used in the compositions of our invention preferably is obtained from mature nuts. However, the liquid endosperm of coconuts at all stages after fertilization can be used. The coconut milk may be heat-sterilized and filtered. It has a pH of from 5.6 to 5.9. This fluid contains some growth factor or combination of factors, which we will refer to hereinafter as the coconut milk growth factor (C. M. F.). Some of these growth factors are more fully described and claimed in the copending application of Frederick C. Steward and Edgar M. Shantz, Serial No. 365,182 filed June 30, 1953, now abandoned, a continuation-in-part of which was filed on July 13, 1955, and given Serial No. 521,860.

The C. M. F. factor can also be obtained from other sources notably immature corn (Zea) grains and other similar sources in which there is a relatively precocious growth of the endosperm.

In the immature fruit of Zea the coconut milk growth factor is especially abundant about 2 weeks after pollination. The C. M. F. factor is also found in female gametophyte of Ginkgo—as a representative of a haploid nutritive tissue, and in certain plant tumors in which cells return to the permanently proliferating state.

By the phrase "synthetic plant growth regulant having plant hormone action" is meant chemical substances of synthetic origin in contrast to those of natural origin, which perform the function of growth regulation or other physiological reaction in the plant system, and are capable of being translocated to various organs by diffusion and other means. In low concentration they foster growth through cell division, cell elongation, and other aspects of metabolism and development. This growth property can be determined qualitatively and quantitatively by our carrot assay test (Caplin and Steward, Nature 163, 920 (1949)). In higher concentrations they function as systemic poisons, affecting germination and even, in some cases, causing death of the treated members.

The synthetic plant growth regulants having plant hormone action that can be admixed with coconut milk to give the compositions of the invention include:

2,4-dichlorophenoxyacetic acid (2,4-D) and its salts, esters, nitriles and amides.

2,4,5-trichlorophenoxyacetic acid (2,4,5-T) and its salts, esters, nitriles and amides.

2,4,5-trichlorophenoxy-alpha-propionic acid and its salts, esters, nitriles and amides.

2-methyl-4-chlorophenoxyacetic acid and its salts, esters, nitriles and amides.

Alpha-(2-naphthoxy)propionic acid, and its salts, esters, nitriles and amides.

2-naphthoxyacetic acid and its salts, esters, nitriles and amides.

1,2,3,4,-tetrahydro-1-naphthoic acid and its salts, esters, nitriles and amides.

The synthetic plant growth regulants having plant hormone action used in the compositions and method of the invention are preferably carbocyclic halogen-containing plant growth regulants having plant hormone action, such as, for instance, 2,4-dichlorophenoxyacetic acid and its salts, esters, nitriles and amides, and 2,4,5-trichlorophenoxyacetic acid, its salts, esters, nitriles and amides.

In operating in accordance with the present invention, any suitable amount, say, at least about 1% by volume, of coconut milk or other source of C. M. F. can be used in combination with the synthetic plant growth regulant having plant hormone action to obtain compositions in which the two substances are mutually activating to give a greater-than-additive result in promoting the growth of such plant parts as, for instance, potato tuber tissue.

The relative proportions of coconut milk and plant growth regulant will vary depending upon the particular plant growth regulant employed, the plant species to be controlled or stimulated, the physiological age of the plants, the prevailing climatic conditions, the purpose for which the composition is being used, etc. It is impossible, therefore, to state exactly the proportions that will be used in all situations. In general, the compositions of the invention will contain in the order of about 6 mg. of plant growth regulant per liter of nutrient solution when used as growth promoting compositions.

By increasing the concentration of the synthetic plant growth regulant having plant hormone action in our novel compositions, the compositions will so stimulate or regulate the plant that toxic effects are obtained. Thus for herbicidal use the compositions of this invention should contain higher concentrations of the plant growth regulant than when used for plant growth promotion. The minimum effective concentration of plant growth regulant in our compositions when used as herbicides will depend on such factors as the particular species of plant to be eradicated, the particular type of vehicle or medium, and whether or not an adjuvant is used. There is no upper limit to the concentration except that dictated by economy.

The compositions of the invention can be employed as a powerful stimulus to heterotrophic plant growth by mixing them with a conventional nutrient medium, such as for instance, White's nutrient solution. ("A Handbook of Plant Tissue Culture" by Philip R. White; The Jacques Cattell Press, Lancaster, Pa., 1943.) A typical basal medium contains inorganic salts, trace elements, sucrose (2%) and the usual organic co-factors such as, for instance, thiamin and pyridoxine.

The compositions of this invention are intended primarily as plant growth promoters. The compositions are especially effective in stimulating the potato tuber tissue into active proliferating growth. They can also be used as herbicides.

The nature of this invention will be better understood by reference to the following illustrative examples:

EXAMPLE 1

Potato explants individually weighing about 3.0 milligrams were removed aseptically from the potato tuber, using a surgical cannula and a device to cut the cylinders so removed into standard lengths. The growth of the small cylindrical explants was then tested by exposing them to a basal medium supplemented by coconut milk and/or 2,4-D.

The basal medium has the following constitution:

| Salts: | Mg./liter |
|---|---|
| $MgSO_4$ | 360.0 |
| $Ca(NO_3)_2$ | 200.0 |
| $Na_2SO_4$ | 200.0 |
| $KNO_3$ | 80.0 |
| $KCl$ | 65.0 |
| $NaH_2PO_4.H_2O$ | 16.5 |
| $Fe_2(C_4H_4O_6)_3$ | 2.5 |
| $MnSO_4$ | 4.5 |
| $ZnSO_4$ | 1.5 |
| $H_3BO_3$ | 1.5 |
| $KI$ | 0.75 |
| Sucrose | 20,000.0 |
| Glycine | 3.0 |
| Nicotinic acid | 0.5 |
| Pyridoxine | 0.1 |
| Thiamin | 0.1 |

The explants were grown on the surface of the nutrient agar in tubes as well as under special conditions that have been found suitable for carrot tissue. (Caplin and Steward, Nature 163, 920 (1949)). Under these conditions the tissue is exposed alternately to air and liquid in special tubes revolving at about 1 R. P. M. around a shaft slightly inclined to the horizontal.

The data in Table 1 and Figure 1 show the results of a symmetrical experiment in which the growth of the cultures was measured in 36 different solutions. The effect of coconut milk alone is shown by the growth in the basal medium supplemented by 0, 0.1, 1, 3, 6 and 18% by volume of sterilized, filtered coconut milk. The effect of 2,4-D alone is shown by the growth in the basal medium supplemented by 0, 0.1, 1, 3, 6, and 18 milligrams per liter of 2,4-D. The interaction of the CMF with 2,4-D is demonstrated by the growth in media containing both supplements in all the possible combinations of the dosages shown in Table 1.

Table 1 shown below describes the growth in fresh weight of 3 mg. explants from potato tuber at 26° C. during a five week period in aseptic nutrient solutions supplemented by 2,4-D and coconut milk.

Table I

| Coconut Milk (percent by vol.) | Mg./liter 2, 4-D | | | | | |
|---|---|---|---|---|---|---|
| | 0 | 0.3 | 1 | 3 | 6 | 18 |
| 0 | 2.7 | 3.1 | 2.4 | 3.1 | 2.5 | 3.2 |
| 0.3 | 3.4 | 6.3 | 5.4 | 6.3 | 4.8 | 3.3 |
| 1 | 2.6 | 7.4 | 16.4 | 21.0 | 43.2 | 11.1 |
| 3 | 3.6 | 30.0 | 32.5 | 47.7 | 44.8 | 38.0 |
| 6 | 5.7 | 39.6 | 56.5 | 90.9 | 81.2 | 44.3 |
| 18 | 9.0 | 93.7 | 102.8 | 156.3 | 164.0 | 68.4 |

The figure shows the data of Table 1 plotted on isometric paper. It is a three-dimensional type of diagram. It will be noted from the table and the figure that at zero or very low concentrations (below 1%) of coconut milk, the effect of 2,4-D on growth is irregular and substantially insignificant and the specific effect of its concentration is also irregular and substantially insignificant. At zero concentration of 2,4-D, the effect of coconut milk on potato tuber is substantially negative at low volume concentrations of coconut milk. Even at large volume concentrations the effect of coconut milk on potato tuber is clearly not of the same order of magnitude as when used in conjunction with 2,4-D.

The solid surface depicted in the figure shows that the optimum concentration of 2,4-D is of the order of 6 milligrams per liter. At this concentration of 2,4-D, the tissue shows the maximum growth response to concentration of the C. M. F., and even at 18% by volume of whole coconut milk the limit of growth response has not been reached. Even greater responses can be expected from the use of the growth factor(s) when separated from the coconut milk.

It will be further noted that using compositions of our invention actively growing tissue cultures from potato tuber have been obtained for the first time. They increased in fresh weight approximately fifty times and they continued to grow for 5 weeks. Subcultures from these continued to grow actively.

EXAMPLES 2–6

Potato explants were removed aseptically as uniform cylinders from potato tubers as described in Example 1 (Ann. Bot. N. S. 16, 219). They were grown under standardized conditions in the specially designed culture tubes using the apparatus described by us in our joint publication with F. K. Millar, Ann. Bot. N. S. 16, 57. Each tube contained a modified White's nutrient solution supplemented in certain cases with coconut milk and a plant growth regulant. The pH of all solutions was adjusted to 6.4.

The following plant growth regulants were tested and found actively as synergists of coconut milk for inducing growth in potato tuber explants:

| Example No. | Plant Growth Regulant | M.P. (° C.) |
|---|---|---|
| 2 | 2,4-dichlorophenoxyacetic acid | 141 |
| 3 | alpha-(2,4,5-trichlorophenoxy) propionic acid | 179–180.5 |
| 4 | alpha-(2-naphthoxy) propionic acid | 107–108.5 |
| 5 | 1,2,3,4-tetrahydro-1-naphthoic acid | 84–85 |
| 6 | 2-naphthoxyacetic acid | 155–156 |

The regulants of Examples Nos. 3, 4 and 5 were tested at 0.1, 1, 6, 30, 60 and 600 p. p. m. while regulants of Examples Nos. 2 and 6 were tested at 0.1, 1, 6 and 30 p. p. m. only.

All treatments except the controls on basal nutrient medium contained 5% whole coconut milk. The initial weight of the explants was 2.6 mgm. The average final fresh weight of 5 explants for each treatment after 5 weeks of growth is given in Table 2. Since compounds 3, 4 and 5 were toxic at 60 and 600 p. p. m. results for the four lower concentrations only are given.

Table 2

Growth in mgm. of 2.6 mgm. potato tuber explants in a medium containing coconut milk and added synergists. Growth period 34 days.

| Regulant of Example No. | Concentration | | | |
|---|---|---|---|---|
| | 0.1 p. p. m. | 1 p. p. m. | 6 p. p. m. | 30 p. p. m. |
| 2 (2,4-D) | 6.6±1.0 | 12.9±1.7 | 17.9±6.3 | 5.8±3.6 |
| 3 | 4.2±0.9 | 9.2±4.7 | 14.9±3.9 | 1.8±0.1 |
| 4 | 4.5±1.3 | 12.7±2.7 | 11.9±2.3 | 1.9±0.1 |
| 5 | 3.2±0.2 | 8.9±1.6 | 14.3±0.4 | 24.4±7.2 |
| 6 | 7.5±2.2 | 13.4±4.7 | 12.0±7.2 | 2.5±1.3 |

Controls:
Basal solution only 2.9±0.5
Basal +5% coconut milk 2.9±0.1

The results indicate that the compounds of Examples Nos. 3–6 are substantially equivalent to 2,4-D in their synergistic action with coconut milk upon the growth of the potato tuber. All of the named regulants at 6 p. p. m. exerted a high order of activity. The activity of the tetrahydronaphthoic acid (Example 5) persists to a higher concentration level.

We claim:

1. A composition comprising coconut milk and a synthetic plant growth regulant having plant hormone action said regulant being selected from the group consisting of 2,4-dichlorophenoxyacetic acid, 2,4,5-trichlorophenoxyacetic acid, 2,4,5-trichlorophenoxy-alpha-propionic acid, 2-methyl-4-chlorophenoxy-acetic acid, alpha-(2-naphthoxy)propionic acid, 2-naphthoxyacetic acid, 1,2,3,4-tetrahydro-1-naphthoic acid, and salts, esters, nitriles and amides of each of the aforesaid acids, said coconut milk being present in an amount of at least about 1% by volume, said regulant being present in an amount sufficient to act as a synergist with coconut milk in stimulating plant growth, said amount of regulant being at least about 0.3 milligram per liter, the proportions of coconut milk and regulant in the composition being such that the composition is effective in stimulating plant growth.

2. A composition comprising coconut milk in an amount of at least about 1% by volume and 2,4-dichlorophenoxyacetic acid in an amount sufficient to exert a synergistic effect on the coconut milk in promoting plant growth, said amount of 2,4-dichlorophenoxyacetic acid being at least about 0.3 milligram per liter, the proportions of coconut milk and 2,4-dichlorophenoxyacetic acid in the composition being such that the composition is effective in stimulating plant growth.

3. A composition comprising coconut milk in an amount of at least about 1% volume and 2,4,5-trichlorophenoxyacetic acid in an amount sufficient to exert a synergistic effect on the coconut milk in promoting plant growth, said amount of 2,4,5-trichlorophenoxyacetic acid being at least about 0.3 milligram per liter, the proportions of coconut milk and 2,4,5-trichlorophenoxyacetic acid in the composition being such that the composition is effective in stimulating plant growth.

4. A composition comprising coconut milk in an amount of at least about 1% by volume and 1,2,3,4-tetrahydro-1-naphthoic acid in an amount sufficient to exert a synergistic effect on the coconut milk in promoting plant growth, said amount of 1,2,3,4-tetrahydro-1-naphthoic acid being at least about 1 p. p. m., the proportions of coconut milk and 1,2,3,4-tetrahydro-1-naphthoic acid in the composition being such that the composition is effective in stimulating plant growth.

5. A composition comprising coconut milk in an amount of at least about 1% by volume and alpha-(2,4,5-trichlorophenoxy) propionic acid in an amount sufficient to exert a synergistic effect on the coconut milk in promoting plant growth, said amount of alpha-(2,4,5-trichlorophenoxy) propionic acid being at least about 1 p. p. m., but less than 30 p. p. m., the proportions of coconut milk and alpha-(2,4,5-trichlorophenoxy) propionic acid in the composition being such that the composition is effective in stimulating plant growth.

6. A composition comprising coconut milk in an amount of at least about 1% by volume and 2-naphthoxyacetic acid in an amount sufficient to exert a synergistic effect on the coconut milk in promoting plant growth, said amount of 2-naphthoxyacetic acid being at least about 0.1 p. p. m., but less than 30 p. p. m., the proportions of coconut milk and 2-naphthoxyacetic acid in the composition being such that the composition is effective in stimulating plant growth.

7. A method of stimulating the growth of plant parts which comprises exposing the plant tissue to the action of a composition comprising coconut milk and a synthetic plant growth regulant having plant hormone action, said regulant being selected from the group consisting of 2,4-dichlorophenoxyacetic acid, 2,4,5-trichlorophenoxyacetic acid, 2,4,5-trichlorophenoxy-alpha-propionic acid, 2-methyl-4-chlorophenoxyacetic acid, alpha-(2-naphthoxy)propionic acid, 2-naphthoxyacetic acid, 1,2,3,4-tetrahydro-1-naphthoic acid, and salts, esters, nitriles and amides of each of the aforesaid acids, said coconut milk being present in an amount of at least about 1% by volume, said regulant being present in an amount sufficient to act as a synergist with coconut milk in stimulating plant growth, said amount of regulant being at least about 0.3 milligram per liter, the proportions of coconut milk and regulant in the composition being such that the composition is effective in stimulating plant growth.

8. A method for promoting the growth of potato tuber which comprises exposing the potato tuber tissue to the action of a composition comprising coconut milk in an amount of at least about 1% by volume and 2,4-dichlorophenoxyacetic acid in an amount sufficient to exert a synergistic effect on the coconut milk in promoting plant growth, said amount of 2,4-dichlorophenoxyacetic acid being at least about 0.3 milligram per liter, the proportions of coconut milk and 2,4-dichlorophenoxyacetic acid in the composition being such that the composition is effective in stimulating plant growth.

9. A method for promoting the growth of potato tuber which comprises exposing the potato tuber tissue to the action of a composition comprising coconut milk in an amount of at least about 1% by volume and 2,4,5-trichlorophenoxyacetic acid in an amount sufficient to exert a synergistic effect on the coconut milk in promoting plant growth, said amount of 2,4,5-trichlorophenoxyacetic acid being at least about 0.3 milligram per liter, the proportions of coconut milk and 2,4,5-trichlorophenoxyacetic acid in the composition being such that the composition is effective in stimulating plant growth.

References Cited in the file of this patent

Article by Chaplin et al. in "Science," vol. 108 (Dec. 10, 1948), pages 655 to 657.